United States Patent [19]

Bock

[11] 4,309,620
[45] Jan. 5, 1982

[54] FLYWHEEL ELECTRIC TRANSMISSION APPARATUS

[75] Inventor: Ditmar H. Bock, Colden, N.Y.

[73] Assignee: Calspan Corporation, Buffalo, N.Y.

[21] Appl. No.: 99,788

[22] Filed: Dec. 3, 1979

[51] Int. Cl.³ .............................................. B60L 11/14
[52] U.S. Cl. .................................. 290/4 R; 290/17; 290/45; 180/65 A
[58] Field of Search .................. 290/4, 14, 17, 45; 180/65; 310/98

[56] References Cited

U.S. PATENT DOCUMENTS

| | | | |
|---|---|---|---|
| 2,138,231 | 11/1938 | Gebhardt | 290/17 |
| 2,179,364 | 11/1939 | Weber | 290/17 |
| 3,538,363 | 11/1970 | Maryanovsky et al. | 310/98 |
| 3,923,115 | 12/1975 | Helling | 180/65 A X |
| 4,034,273 | 7/1977 | Meek et al. | 290/14 X |
| 4,233,858 | 11/1980 | Rowlett | 290/45 X |

*Primary Examiner*—B. Dobeck
*Assistant Examiner*—W. E. Duncanson, Jr.
*Attorney, Agent, or Firm*—Biebel, French & Nauman

[57] ABSTRACT

In a preferred embodiment, the flywheel electric transmission system is made up of three electric machines and a flywheel and is adapted for use in an automobile. The first electric machine is driven or energized by a prime mover such as a heat engine and is selectively clutched to the second machine. The flywheel and the armatures for both the first and second machines rotate as a unit. The third machine is connected to the second machine through gearing and, under the control of a computer, supplies excess electrical power to or consumes excess electrical power from the first and second machines that are functioning as either a motor or generator as required. In a second embodiment, the energy source is a battery pack.

49 Claims, 12 Drawing Figures

FLYWHEEL ELECTRIC TRANSMISSION APPARATUS

BACKGROUND

The present invention relates to an apparatus for the transmission of power from a source to a load and, more particularly, to a flywheel electric transmission system which may be advantageously, although not exclusively, employed for vehicular propulsion.

In an attempt to conserve energy and reduce air pollution, various alternatives to the use of conventional internal combustion automotive engines have been proposed. Among these alternatives, systems commonly known as hybrids have been suggested. Some hybrid systems incorporate a battery pack for supplying power during short-trip driving and a fuel burning engine for longer trips. Other types of hybrid systems combine a relatively low power prime mover or engine with an energy storage device, such as a flywheel, for supplementing the power output of the engine in situations where the load (the wheels of the vehicle) requires more power or torque. Still other types combine a battery pack and an energy storage device. Thus, in a hybrid system where the engine power is sufficient for cruising on level roads, supplemental power may be required for going up grades, for quick acceleration and the like. This additional power is supplied from the flywheel in the form of kinetic energy which would have been stored therein during periods where the engine was delivering more power than required, such as during periods of driving on a down grade, of braking and the like.

Heretofore, these hybrid systems comprised essentially: a prime mover or engine developing a mechanical power output; a generator for converting such mechanical power to electrical power; an energy storage device such as a flywheel or battery; a load such as wheels; and at least two motor/generator devices for transmitting power to or receiving power from the flywheel or batteries and the load. At each point where power is converted from one form to another (mechanical to electrical and vice versa) conventional conversion circuits are required for matching voltages or frequencies, as is well known. Losses in overall power and efficiency result at each point where power is converted in the motors, generators or conversion circuits. Thus the multiple power conversions of these types of hybrid systems create losses which cumulatively affect the ability of the system to perform efficiently.

In addition to the multiple conversion losses in power, such hybrid systems suffer from weight losses in that each employs at least three relatively large sized separate electric machines and energy storage means thereby adding to the bulk and overall cost of a system.

SUMMARY

The above disadvantages, as well as others, are overcome by the teachings of the present invention which provides a highly efficient, compact and low cost hybrid system.

The system according to the present invention provides a flywheel electric transmission that does not suffer from the magnitude of multiple conversion losses inherent in the presently known systems. It is therefore an object of the present invention to provide a hybrid system wherein the prime mover or engine may be directly coupled to the load, so that no power conversions are required and no losses associated therewith are suffered.

It is a further object of the present invention to provide a hybrid system wherein conventional conversion losses are only encountered during periods of variable demand upon the engine and further that such losses are held to a small fraction of what they would be in a conventional system.

A still further object of the present invention is to provide a compact system wherein two of the major components are integral parts of a single unit, thereby reducing the size, weight and cost of the system and, more importantly, permitting the attainment of certain unexpected results as will become apparent hereinafter.

It is an additional object of this invention to provide a flywheel having integral therewith an armature for each of two motors/generators, sometimes referred to hereinbelow as "electric machines".

It is a further object of this invention to provide a system using a source of substantially constant power to supply power to a variable demand load.

It is a still further object of this invention to provide a flywheel electric transmission including a third electric machine scaled to provide or consume any imbalance in the power flow between two other electric machines.

The foregoing objectives are achieved in accordance with the present invention as a result of an improved variable speed flywheel electric transmission wherein the flywheel, in addition to performing as a kinetic energy storage device when acting in a first mode, also functions as essentially the armature for, and therefore an integral part of, two electric motor/generator devices or, simply, electric machines, when acting in a second mode. The arrangement of parts is such that although the flywheel is not mechanically connected to the output shaft or to the prime mover or engine which is coupled to the first electric machine, a significant portion of its stored energy is derived from or supplied to the output shaft of the prime mover without the above-mentioned conversion losses, and, in fact, without any substantial losses at all. Thus, in the present invention the advantages of a direct mechanical connection are achieved without the additional requirement of driving separate and independent electric machines from the prime mover and the output shaft and without the abovementioned losses associated therewith.

Additionally, the compact and integral transmission unit also permits a clutched direct drive between the two electric machines for which the flywheel serves as a common armature and, hence, the prime mover or engine output shaft can be directly coupled to the load with virtually no loss whatsoever.

Moreover, the arrangement permits the supplying of excess electrical power to the load either directly through the third electric machine or through the flywheel. In this manner electrical energy that is generated in the process of increasing the speed of an electric machine employing the flywheel of the present invention does not have to be dissipated or wasted in load resistors or the like, but, rather, is supplied to the load.

The arrangement of the present invention further permits the use of a third electric machine for supplying or consuming excess electrical power to or from the two electric machines of which the flywheel is an integral part. In this manner, some of the transfer losses usually associated with the transfer and utilization of excess electrical power, as for example the charging and discharging of a battery, are avoided.

Basically, in the preferred embodiment, the present invention provides a first electric machine mechanically connected to a prime mover, a second electric machine adjacent to said first machine and adapted to be selectively, mechanically connected to said first electric machine for rotation therewith, a kinetic energy storing device operatively associated with the first and second machines and carrying the armatures therefor, and means for utilizing excess electrical power generated between said second machine and said kinetic energy storing device when said first and second electric machines are mechanically disconnected.

While the present invention is more efficient than state-of-the art devices, it still has some conversion losses. In stop and go driving these losses are much smaller than the surplus energy returned to the flywheel during braking. However, in highway driving, these conversion losses are eliminated by mechanically coupling the input and output shafts through a clutch.

BRIEF DESCRIPTION OF THE DRAWINGS

For a fuller understanding of the present invention, reference should now be made to the following detailed description thereof taken in conjunction with the accompanying drawings, wherein.

DESCRIPTION OF THE PREFERRED EMBODIMENTS

Figure 1:
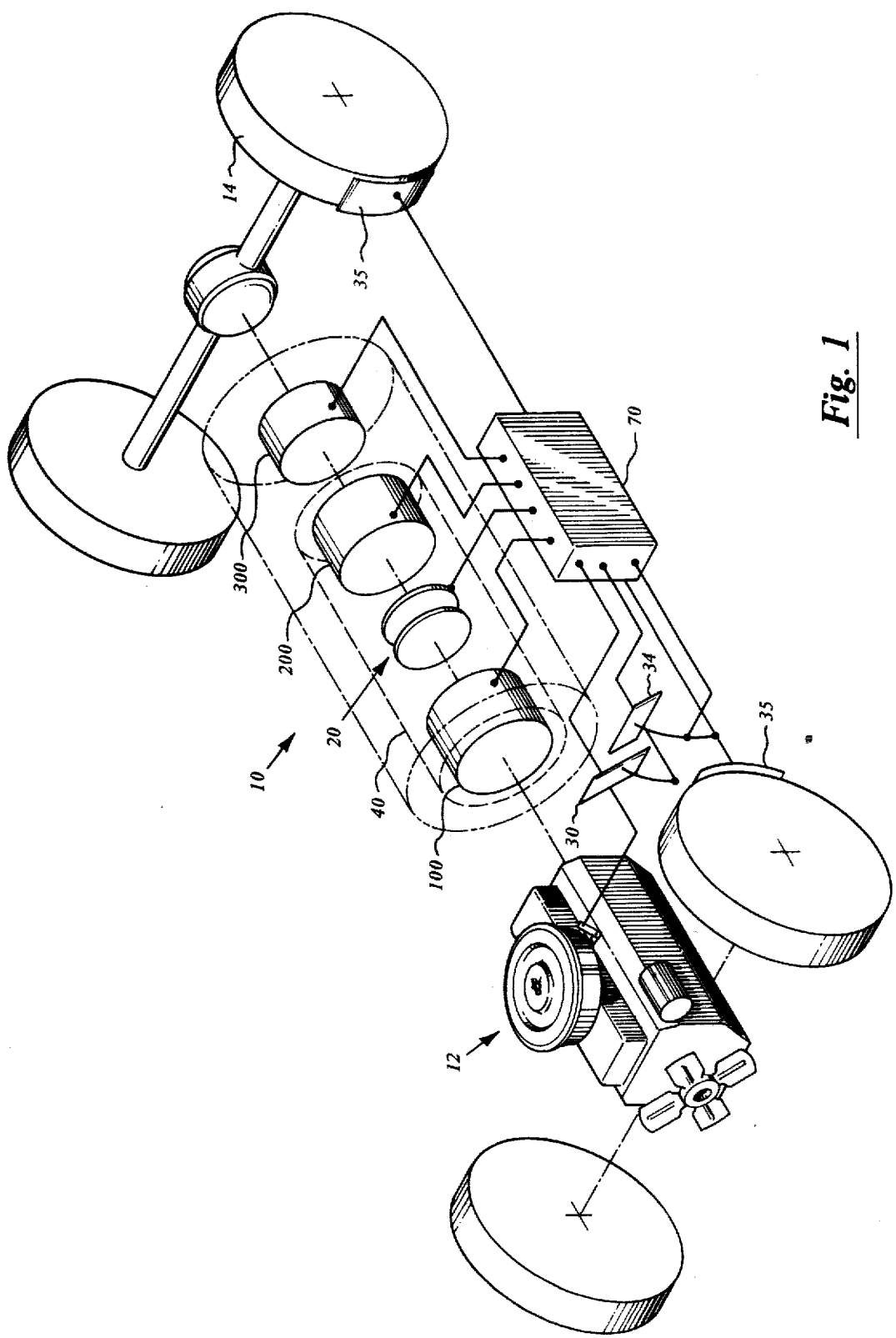
FIG. 1 is a simplified pictorial view of a first embodiment of the present invention employed in an automobile.

In FIG. 1 the numeral 10 generally designates the flywheel electric transmission, or "FLET", which is made up of three electric machines, 100, 200 and 300, a flywheel 40, electric controls in the form of computing device 70, and clutch 20. FLET 10 is located between, and is mechanically connected to, a prime mover such as an internal combustion engine 12 or a battery pack, as described below, and a load such as the wheels 14 of an automobile. For cross-country driving the shaft of the first machine, 100, is driven by the heat engine 12. Electric power flow in the first two machine sections is either in surplus or shortage except at the transition point which occurs at one particular transmission speed ratio. During acceleration, for example, new power is generated by the rapid withdrawal of energy from the flywheel 40 as it slows down. This power surplus is recycled by the third machine section. The third machine, 300, reacts against the vehicle frame during acceleration when power is applied to it to help accelerate the car. Under other conditions, such as braking, the third machine, 300, acts as an induction generator that provides the electrical power for the second machine, 200, that accelerates the flywheel 40.

The speeds of heat engines and automobile drive shafts—of the order of a few thousand rpm—are too low for flywheels of suitable dimensions. Efficient, fixed-ratio gears at the input of the first machine and the output of the second machine provide proper speed matching.

A hoop flywheel which has 82% of the energy density of a solid disk can be driven electrically by torques applied with a field structure mounted inside the hoop and supported on internal ball bearings. If the hoop is fairly thin, radial stresses are small and the composite structure for the hoop can be wound in the manner of a spool of thread on very simple machinery. A limited amount of iron and copper or aluminum can be placed inside the hoop to serve as the armature of an induction motor, or permanent magnetic structures might be placed there instead for a parametric motor. A flywheel operating over a four to one speed range allows fifteen sixteenths or about 94% of its energy content to be exchanged with its power source or load.

In the power transfer mechanism employed in FLET, mechanical and/or electrical power is applied to the field winding of a polyphase AC motor rotating at angular rate ($\omega_1$). The squirrel-cage armature of this motor, spinning at angular rate ($\omega_2$), is integral to the flywheel. The mechanical power delivered to the flywheel is the sum of mechanical and electrical input power. The electrical power required, and the losses in electrical components, can be much less here than in a conventional motor if the engine and drive shafts run at similar rates. For example, one unit of electrical power is sufficient to draw four units of mechanical power from the engine and deliver five units to the flywheel when the flywheel rotates at 5/4 of the speed of the engine.

An induction generator is very similar to an induction motor in appearance and has a set of field windings which is excited in a rotational sequence to create a rotating field. The shorted turns of a squirrel cage armature are permitted to "push" this field at a higher rate of rotation to induce a current that leaves the field windings. This current, flowing into the impedance of the source of excitation, e.g. a DC to AC inverter, would raise the excitation voltage. By rectifying this current and recovering the DC, the various exciters can be driven, as by a battery that also permits the starting of the system.

An induction generator is mounted opposite the induction motor that connects the flywheel to the heat engine shaft and, in turn, is connected to the differential of the vehicle. The car will remain stationary as long as this generator is excited at the angular rate of the flywheel. If it is excited at a lower frequency a torque is exerted on the output shaft, tending to accelerate it and the car is on its way. Current will flow out of the field windings and, after rectification, charge the battery and drive the exciter for the heat engine-to-flywheel motor.

The calculated amount of power and energy needed for a 2,400 pound car undergoing various driving maneuvers can range from a low of 20 hp and no energy storage on a perfectly smooth and level road to a power-absorption demand of 300 hp in an emergency stop and an energy storage demand of 15 megajoules to climb from Denver (5,000 feet altitude) to Loveland Pass (12,000 feet), for example. Such extreme demands can be met better with good, conventional hydraulic brakes and by making long climbs at reduced speed. On the other hand, it has been calculated that lesser storage—about one megajoule—suffices for all normal demands and therefore a 100 hp short term, 40 hp average power rating at the driveshaft meets the majority of driving demands. Brakes must be provided, as a backup to flywheel recycling, in any case.

In its simplest mode of operation, namely cross-country driving on a level road, FLET provides a straight mechanical connection from the heat engine to the drive shaft. The shaft of the first machine is mechanically clutched to that of the second machine. On a level road, no electrical power need be applied to the machines and slight variations of the heat engine fuel supply would serve to control typical highway speeds.

Highway slope variations, power demands for passing, wind gusts and other, larger power variations can be accommodated by connecting the second machine, 200, to the third machine, 300, through suitable electrical switch gear in computing device 70. When the car is going downhill, surplus mechanical power is available for storing in the flywheel 40. For example, when the flywheel 40 is rotating more slowly than the drive shaft a suitable excitation frequency is applied to the field windings of the second machine that will exert an accelerating torque on the flywheel 40. While bringing the flywheel 40 up to speed, the second machine, 200, is an induction generator and produces a small amount of electrical power. This electrical power is applied to the third machine, 300. This electrical power is less than a third of the power that is taken from the drive shaft to accelerate the flywheel 40. The result is a net energy transfer from the car to the flywheel 40.

After the flywheel 40 reaches synchronism with the shaft, electrical power flow must be reversed to add further energy to the flywheel 40. When power demand increases, energy can be withdrawn from the flywheel 40 and added to engine power.

During braking, the third machine, 300 is excited as an induction generator to provide dynamic braking. When the brakes 35 are first applied, while the drive shaft may still be spinning faster than the flywheel 40, both the second and third machines act as generators and the first machine is then used to consume excess electrical power for accelerating the flywheel 40. As braking continues, the generated electric power from the third machine, 300, is used to excite the second machine, 200, as a motor accelerating the flywheel 40 and storing braking energy. This process is reversed when the car is accelerated where electric power, generated as the armature carried by flywheel 40 slows down with respect to the field of the second machine, 200, is applied to the third machine, 300, to drive the car forward.

When accelerating from a start, the second machine, 200, is connected as a generator and provides electrical power to the third machine, 300. The drive shaft torque is the sum of the torques derived from the second and third machines. After the second machine speed exceeds that of the flywheel 40, the first machine, 100, is used as a generator to provide the electrical power to accelerate the third machine, 300.

The first machine is also used when the car is stopped at an intersection, for example, to prevent the car from creeping as with an automatic transmission. By feeding power to the flywheel 40 via the first machine, 100, reaction from the flywheel 40 on the second machine, 200, and drive shaft is eliminated.

Figure 2:
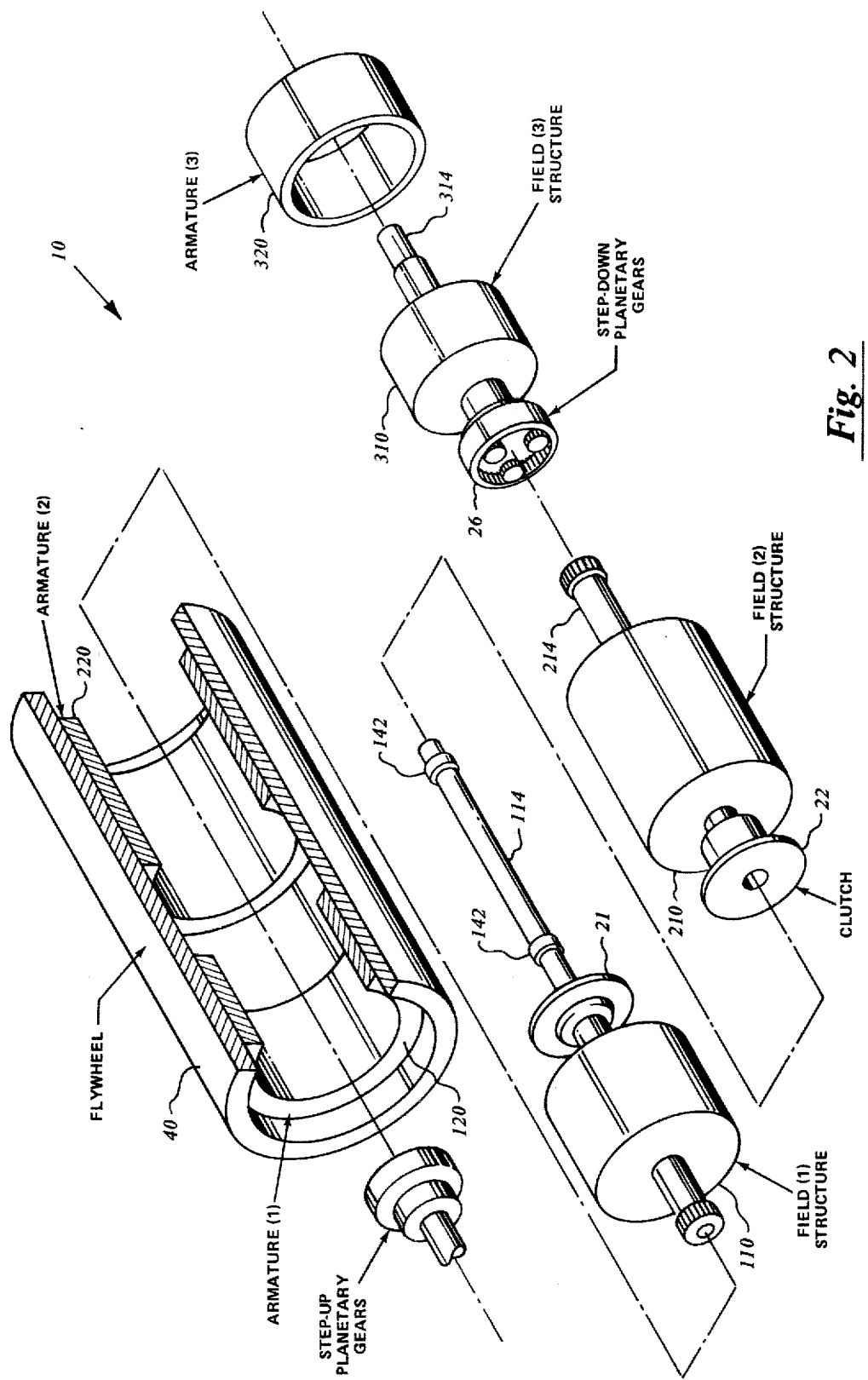
FIG. 2 is an exploded view of the flywheel electric transmission.
Figure 3:
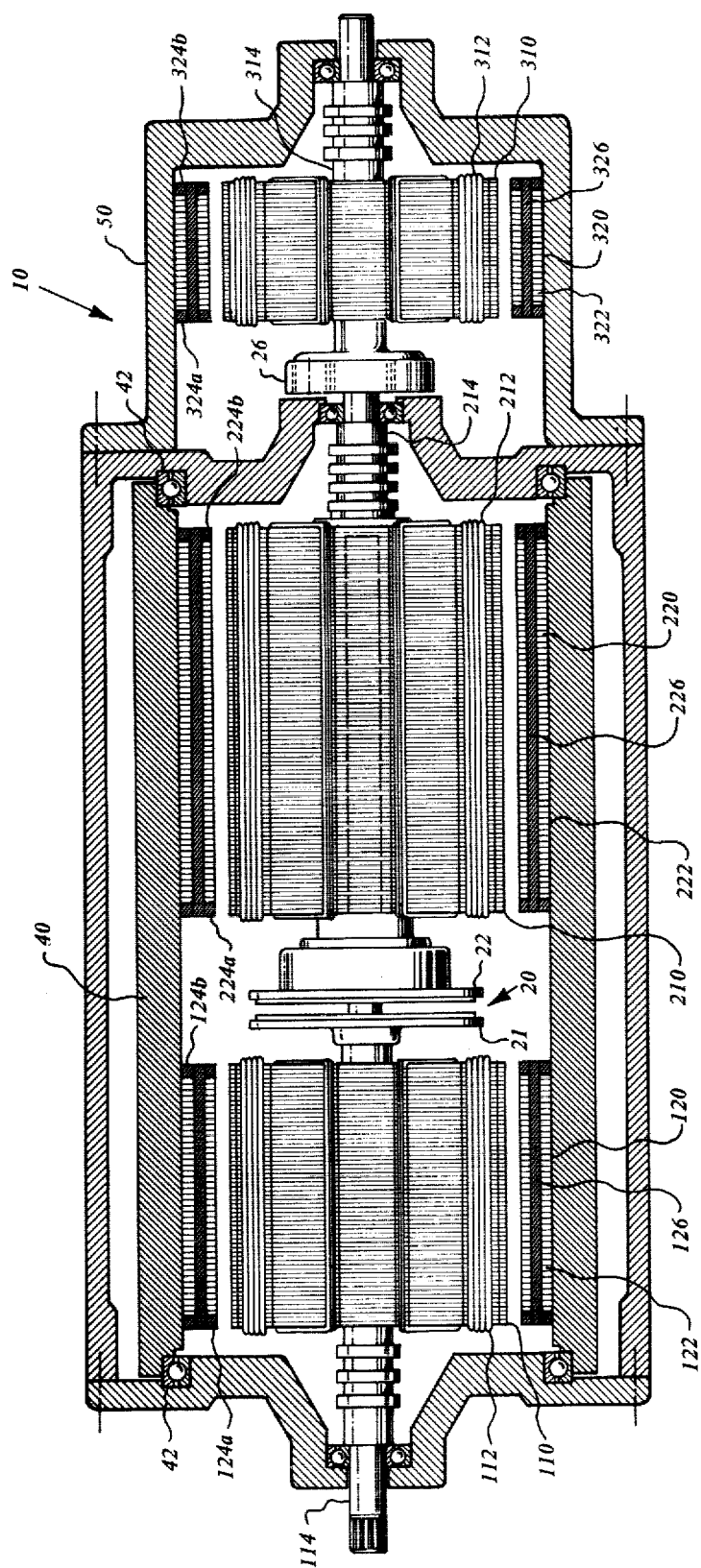
FIG. 3 is a partially sectioned view of the flywheel electric transmission of FIG. 2.
Figure 4:
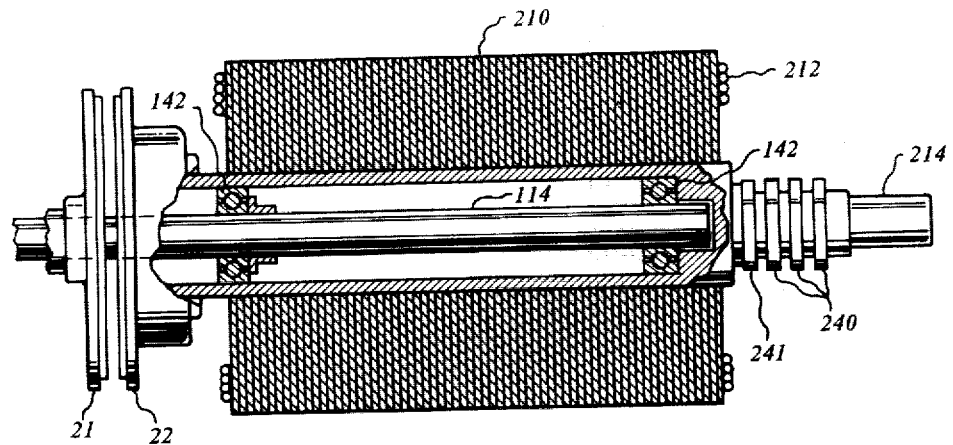
FIG. 4 is a partially sectioned view of the core of the second electric machine.

Referring to FIGS. 2 and 3, FLET 10 contains three everted polyphase induction motors/generators with short-circuited, or squirrel cage armatures. Each of the induction motors/generators has a laminated magnetic core 110, 210 and 310, respectively, with windings, 112, 212 and 312, respectively, located thereon and making up the field structure for the respective motors/generators. Shaft 114 is coaxial and concentric with core 110, clutch 20, core 210 and its hollow shaft 214 and is connected to core 110 for rotation therewith as a unit while shaft 214 of core 210 is maintained in an essentially frictionless, non-driving relationship with the shaft 114 by bearings 142, as best shown in FIG. 4. Shaft 314 is coaxial with shaft 114 and is connected to core 310 for rotation therewith as a unit. Shafts 214 and 314 are mechanically connected through step-down planetary gears in gear box 26. Armatures 120, 220 and 320 are coaxial with and radially outward of cores 110, 210 and 310, respectively, and are made up of laminated iron cores 122, 222 and 322 with copper or aluminum end plates 124a and b, 224a and b and 324a and b, respectively, and copper or aluminum bars 126, 226 and 326, respectively. The armature 320 is secured to the housing 50 in a fixed position whereas armatures 120 and 220 are secured to flywheel 40 and rotate as a unit therewith on ball bearings 42. Clutch 20 is made up of driving clutch plate 21 which is secured to and acts as a unit with shaft 114 and driven clutch plate 22 which is secured to and acts as a unit with shaft 214; the plates being selectively engageable to cause cores 110 and 210 to act as a unit.

Figure 5:
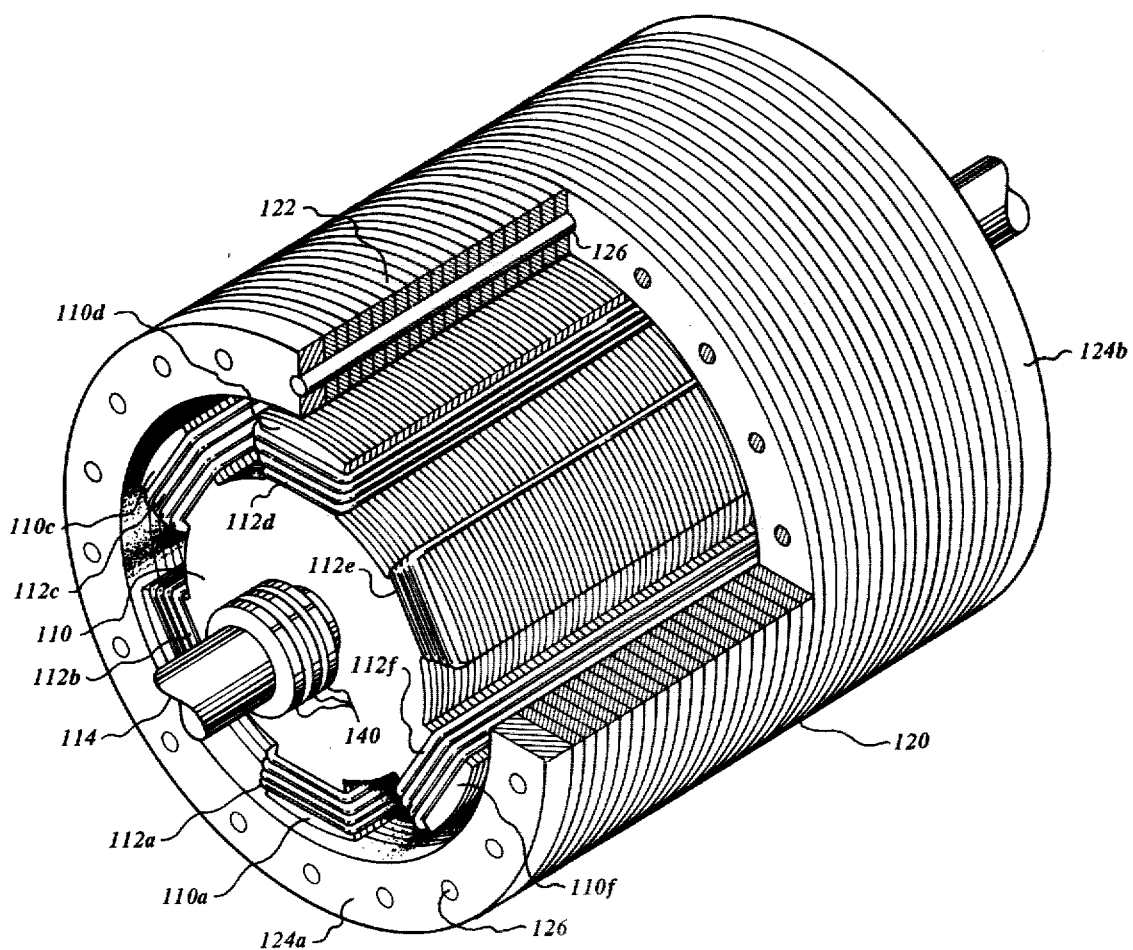
FIG. 5 is a partially cut away pictorial view of the first electric machine.

The three electric machines are essentially identical except for: (1) armatures 120 and 220 in the first two machines are allowed to rotate whereas armature 320 is stationary with respect to housing 50; and (2) cores 210 and 310 are always mechanically connected whereas core 110 is selectively mechanically engaged to core 210 via clutch 20. Therefore, although FIG. 5 is specific to the first machine, it generally depicts the second and third machines also. In FIG. 5 the core 110 has a six-pole structure and the windings on opposite poles are preferably connected in series. The three resulting winding sets are configured into a Y-connection with one common terminal and three phase terminals connected to the three terminals of an inverter that converts DC to 3-phase AC. The copper or aluminum end plates 124a and b and bars 126 make up the squirrel cage of armature 120. The iron laminations 122 of armature 120 may be thicker than those of core 110 since the frequency of field reversals in armature 120 will be relatively low under most operating conditions. It would be incorrect, however, to refer to either the cores 110 and 210 or armatures 120 and 220 as stators since each is expected to rotate with the first and second machines, respectively, rotating much as in an electromagnetic coupling. The structural difference between an electromagnetic coupling and that of the first and second machines of the present invention is that the present invention allows significant speed differentials—in excess of the rotational speeds of either component in an inertial frame—to exist between the "coupled" components for extended periods, and with tolerable power loss.

The first electric machine of FIG. 5 functions as follows: An electric current is supplied via slip rings 140 to suddenly set up a magnetic field in a radial direction through the centers of two opposing field pole pieces, 110a and d, of core 110 by field windings 112a and d. As this field spreads between the bars 126 of the armature 120 it induces a voltage in the bars 126 that, being short-circuited by the end plates 124a and b, causes a current to flow in the bars 126. The magnetic field due to the current flow in the bars 126 of armature 120 opposes the applied field—the portion of the armature laminations opposite a north pole of the field piece, e.g. field pole piece 110a, acts as a south pole. When the field winding voltage applied to field windings 112a and d is suddenly removed, the currents and magnetic fields in the adjacent armature conductors decay slowly, with a time constant given by the ratio of their inductance to their resistance. The decay time may be made fairly long by making the resistance of the bars/conductors 126 low and by increasing inductance through close magnetic coupling with magnetic materials of high permeability as represented by core 122. In a typical induction machine this time constant is of the order of ten to one hundred times as long as the period of application of the magnetic field to one pole pair, e.g. 110a and d. This is manifested by an optimum in the performance of an electric machine of this type within about 10% of the synchronous speed as defined hereinafter.

If field windings 112e and b are next excited so that the resulting north and south poles are rotated 120° clockwise, as shown in FIG. 5, thereby generating a field at an angle of 120° from the original field, a force couple, or torque, will be applied to armature 120, which still has magnetic poles opposite the original field poles. This sets the armature 120 into motion in a clockwise direction with respect to the field windings. If no other torques, e.g. friction, opposed the rotation of armature 120, it would eventually attain a speed of rotation identical to that of the field; i.e. one-third of the rate of switching the field from one pole to another pole that is one-third of a rotation further clockwise or away. The field rate of rotation is the synchronous speed. In contrast, in the third machine where armature 320 is connected to the housing 50, the torque so generated will serve to rotate the core 310 in a counterclockwise direction. The field structure/core 110 can, of course, be caused to rotate, in either direction, by the application of suitable mechanical torques through shaft 114. To achieve this rotation, the field excitation currents are brought to the field windings 112a-f by conventional sliprings 140 and brushes (not illustrated). The speed of rotation of the armature 120, when the field is rotated, is the algebraic sum of the rotational speed of the field and of the rotational speed of the armature 120 with respect to the field. In the example supra, the armature 120 might rotate clockwise, counterclockwise or not at all in an inertial frame, depending on the speed and direction of rotation of the field structure/core 110 and the rate and direction at which current is switched from one pole pair to the next.

An additional feature of an induction machine is its ability to provide electrical power, i.e. to act as a so-called induction generator, when it is absorbing mechanical power from an external source. If the armature 120 were spun rapidly in a clockwise sense with respect to the field, for example, while the diametral pairs of field windings 112a-f are excited sequentially, as described above, but at a slower rotational speed, or excitation frequency, than that of the armature 120, then current would flow out of the field windings. This AC current can then be rectified to produce DC for use in an inverter to excite another machine, for example. A circuit suitable for exciting the electric machine of FIG. 5 as either a motor or a generator is shown in FIG. 6.

Figure 6:
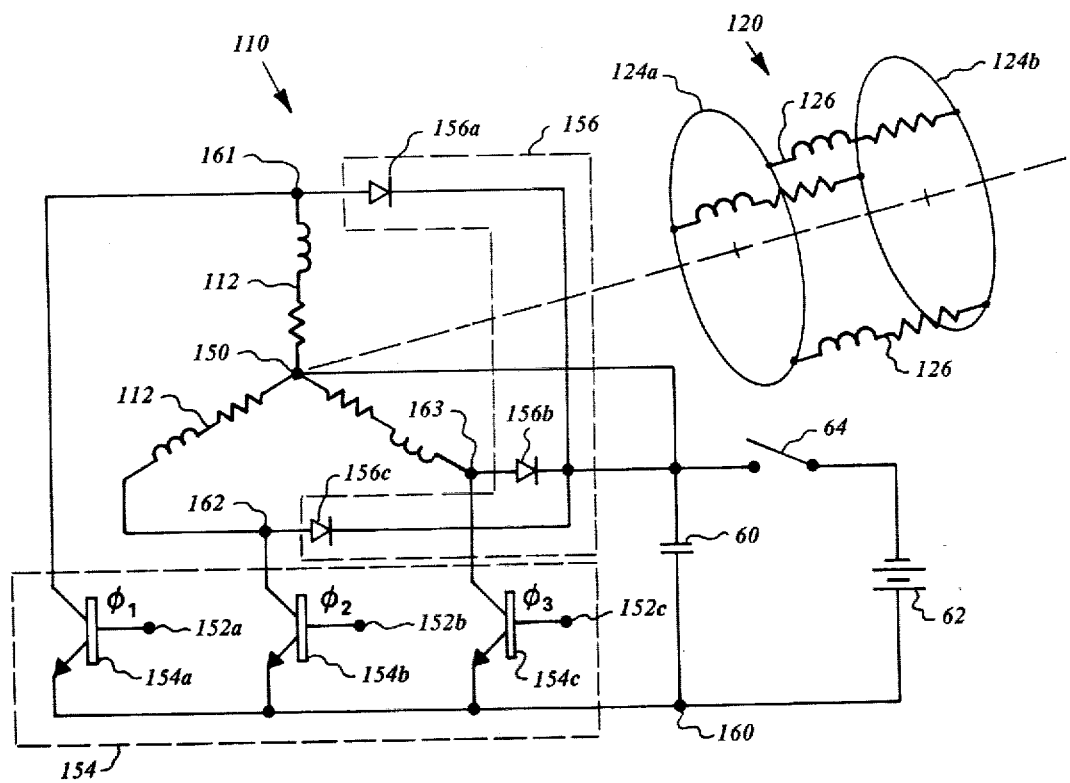
FIG. 6 is a diagram of a circuit for exciting the electric machine of FIG. 5.

In FIG. 6 the armature 120 includes the resistance and inductance of armature conductors/rods 126 which are located between shorted end plates 124a and b. The armature conductors 126 are closely coupled to the field structure/core 110 with whose resistance and inductance of field windings 112 they interact as in a transformer, with the additional effects, described supra, that are characteristic of an induction machine. The field windings 112 are joined at one terminal, 150, and are excited on their 3-phase terminals 152a-c by inverting means 154 in the form of driving transistors 154a-c that can produce a rotating magnetic field, as described above, if suitable control voltages, $\phi_1$, $\phi_2$ and $\phi_3$, are applied to the terminals 152a-c, respectively, to excite fields in the sequence ABC, assumed clockwise, or ACB, assumed counterclockwise. Rectifying means 156 in the form of diodes 156a-c permit the recovery of energy stored in the inductance of windings 112 or in the kinetic energy of rotation of the armature 120, a described supra, and direct this stored energy to a storage capacitor 60. After a period of nonuse, the capacitor 60 may be discharged and could be augmented by storage battery 62 which is connected temporarily via starter switch 64. It should be emphasized that storage battery 62, known as an amenities battery to automotive engineers, is not to be construed as a means of operating or propelling the load to be driven by the FLET; it merely facilitates starts as described further infra. The use of a propulsion battery as the energy source and also for starting is an alternative where there is a battery pack for use as the energy source, as described below. The control voltages, $\phi_1$, $\phi_2$ and $\phi_3$, applied to the terminals 152a-c of inverters 154a-c can be generated in many ways as by analog or digital computers or by hybrid computers that combine features of both as is shown infra in FIG. 9. A combination of digital and hybrid controllers are the most practical means of driving inverters 154a-c devised to date. FIGS. 7a-f show waveforms suitable for exciting the electric machine of FIG. 6.

The driving inverters/transistors 154a-c operate either as a short circuit with high current flowing from collector to emitter terminals and no significant voltage between these terminals or as an open circuit, with any reasonable voltage between emitter and collector but with negligible current flow, to prevent its destruction by excessive joule heating. Diodes 156a-c act in an analogous manner. Other semiconductor devices such as silicon controlled rectifiers, triacs, etc. can be substituted for the transistors and rectifiers to achieve similar results.

In order to establish a rotating magnetic field, as described earlier, in the electric machine of FIGS. 5 and 6, control voltages, $\phi_1$, $\phi_2$ and $\phi_3$, are applied to the terminals 152a-c. The phase voltage at terminals 162 would exhibit the waveforms, measured with respect to point 160, shown in FIGS. 7d-f if rectifiers 156a-c were disconnected. Following the current pulse, the corresponding field phase terminals of the machine would assume various potentials that depend on the relative speed of rotation of the parts of the machine and the speed of rotation of the applied magnetic field, as shown in FIGS. 7d-f, and explained infra.

When the machine is synchronous with the field, absent any losses due to friction and resistance, the average current into capacitor 60 should be equal to the current leaving, with switch 64 open. This is achieved by applying external power to offset losses and this may be done either mechanically through the shaft 114 or electrically by current flowing into capacitor 60. In the ideal case the waveform of FIG. 7d would be generated at field phase terminal 162 if diode 156b were momentarily opened, i.e. if the field windings were open circuited. The voltage at field phase terminal 162 would be zero for one-third of the time, and one and one-half times the average voltage stored on capacitor 60 for two-thirds of the time. When the diode 156b is connected, the current, through the constant impedance of one field winding, due to the waveform of FIG. 7d flows into capacitor 60 with a strength of one-half unit for two-thirds of the time, and out of the capacitor 60 with a strength of one unit for one-third of the time. The charge on capacitor 60, when averaged over one complete cycle of the waveform, therefore remains constant.

Figure 7:
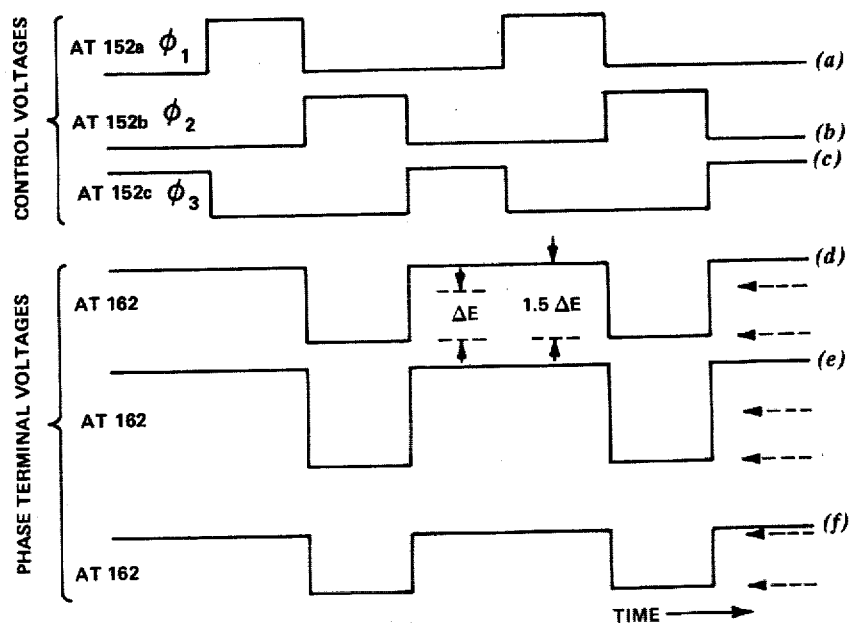
FIGS. 7a-f are typical waveforms used in the circuit of FIG. 6 for exciting the electric machine of FIG. 5.

If the armature 120 is running faster than synchronous, the open circuit voltage on the field phase terminal 162 between the excitation pulses applied at terminal 152b exceeds one and one-half times the previous average of the voltage on capacitor 60, as illustrated in FIG. 7e. As a consequence more current flows into the capacitor 60 than flows out and its average voltage slowly rises, representing absorption of energy. If the machine runs at less than synchronous speed, or at near-synchronous speed, since losses are always present in practice, capacitor 60 is slowly discharged, by similar reasoning, and the waveform is shown in FIG. 7f. Field phase terminals 161 and 163 would have corresponding readings.

It should be emphasized that the choice of synchronous speed and the related frequency of the excitation pulses or control voltages applied at terminals 152a-c are design choices with the frequency of the excitation pulses generally being similar to the rotational speed of the armature with respect to the field, e.g. within 10% of that speed.

Figure 8:
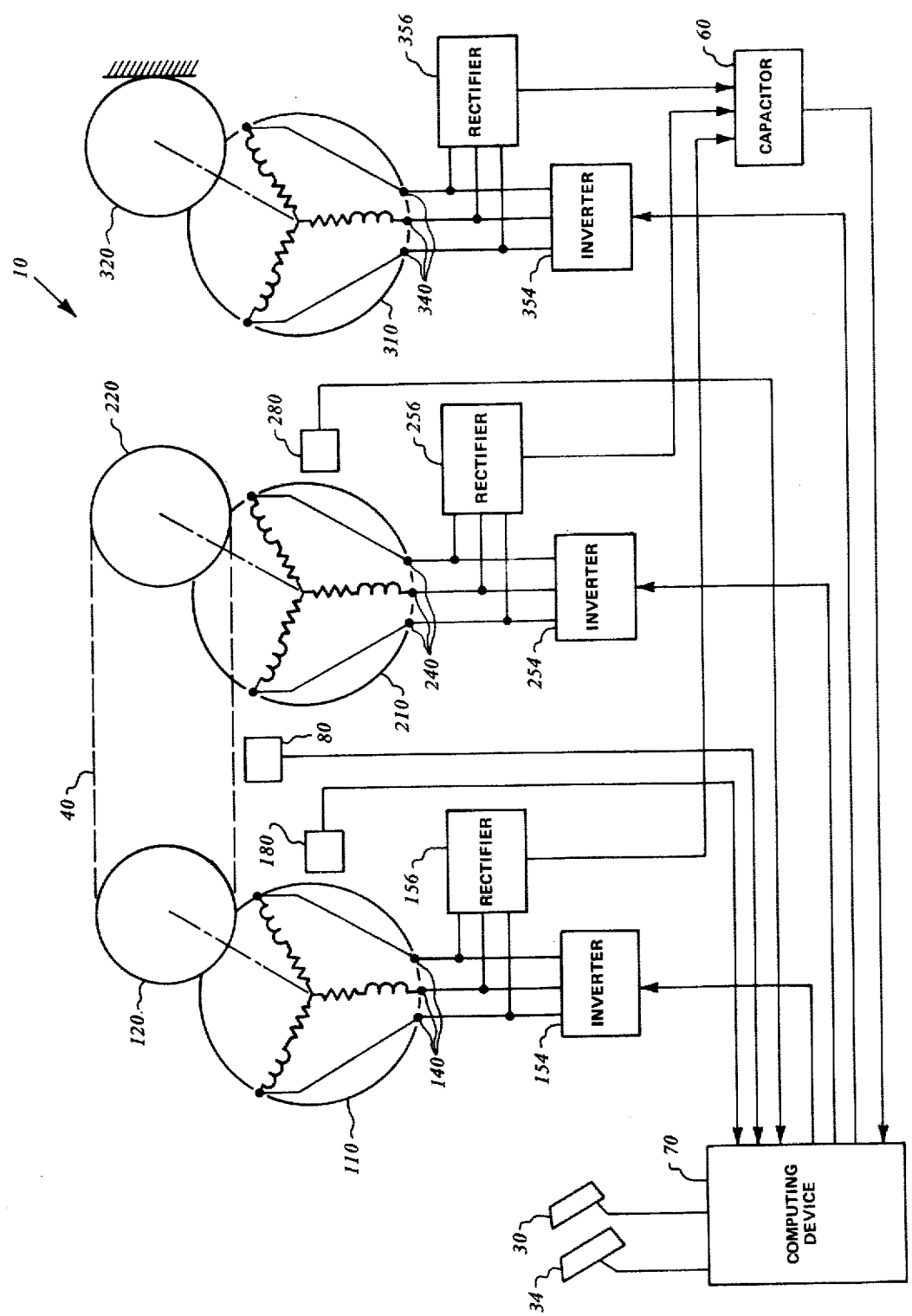
FIG. 8 is a block diagram of the flywheel electric transmission system.

Referring to FIGS. 3 and 8, the flywheel electric transmission 10 effects the efficient transfer of energy between a primary power source/prime mover and a mechanical load by means of the three electric machines which share a capacitor 60 and where the inverting and rectifying structures 154, 254 and 354 and 156, 256 and 356, respectively, are shown as blocks for clarity and are connected to the respective machines via sliprings 140, 240 and 340. Each inverter 154, 254 and 354, is supplied with control pulses by computing device 70 which selects excitation frequencies for the three machines, under command of an operator and with consideration of the rotational speed of the three machines. Two of the machines are commanded to effect the desired flow of energy from the prime mover to the load. The remaining machine is commanded to keep the charge on the storage capacitor 60 constant in order to allow continued operation of the transmission with minimal waste of energy.

The machine in secondary use, usually the third machine which is coupled directly to the output shaft, is excited to provide (or dissipate usefully) whatever power is needed (or surplussed) in the primary machines. The frequency of excitation of the secondary machine is related to the relative speed of its components and the difference between the voltage on the storage capacitor 60 and a reference or bogey voltage that is optimal for the operation of the machines, as follows: When the capacitor voltage is greater than the bogey value, surplus electrical energy has been accumulated and the secondary machine is employed as a motor, with its excitation frequency (in hertz) higher than its rotational speed (in revolutions per second). The added electrical load will reduce the charge on the capacitor 60. When the capacitor charge is less than the bogey voltage, the excitation frequency is made less than the secondary machine's rotational speed, to add to charging capacity.

From the above, it is apparent that computing device 70 can perform its functions if it is provided with information about the speeds of rotation of all independently rotatable elements of the flywheel electric transmission 10 and other data such as the voltage on storage capacitor 60 as well as the operator inputs that indicate the desired direction of power flow and the operator's choice of configuration.

The first electric machine 100 of FLET, in conjunction with the amenities battery 62 and flywheel 40, could be used to start the prime mover, or heat engine 12. For this purpose inverter 154 would be caused to apply AC power derived from the battery to the first machine in order to accelerate the flywheel to a few thousand RPM. This operation would be conducted at very low power level of a few hundred watts to keep the reaction torque on the heat engine shaft from cranking the latter backwards. When enough energy to start the heat engine has been stored in the flywheel, the first machine is excited as a generator thus cranking the heat engine in its normal running direction as in an inertia-type starter. Electric power surplussed by the first machine may be recycled to the battery, but at best only about one-half of the starting energy can be recovered, due to inefficiencies in energy conversion. It should be noted that the worst-case cranking energy has to be withdrawn from the battery in each start, but it is taken with much greater efficiency, at a slower rate than with a conventional, series-wound starting motor. It should be apparent that in normal operation of FLET a small amount of electrical power can be drawn from the rectifying means 156, 256, 356 to keep the amenities battery charged and to operate lights, ignition systems, etc., thus obviating the need for a generator or alternator.

Possible configurations include, among others, a battery flywheel hybrid mode, a heat engine transmission mode and a heat engine flywheel hybrid mode with a rigid connection via clutch plates 21 and 22 between the field structures of the first two engines.

Each of the three machines is assigned a role as a motor or generator on the basis of the selected operating mode and relative speeds of rotation that can be calculated from the speeds of the various rotating components as measured by rotation sensors such as tachometers 80, 180, and 280 which are suitably located for measuring the rotation of members 40, 110, and 210, respectively, and are electrically connected to computing device 70. Since cores 210 and 310 are always mechanically connected through gear box 26 it is not necessary to measure the rotational speed of both. Acceleration or braking commands in combination with rotational speed data from sensors 80, 180 and 280 and the state of storage capacitor 60 would be used by computing device 70 to command the frequency with which each of the three machines of FLET 10 is excited.

Figure 9:
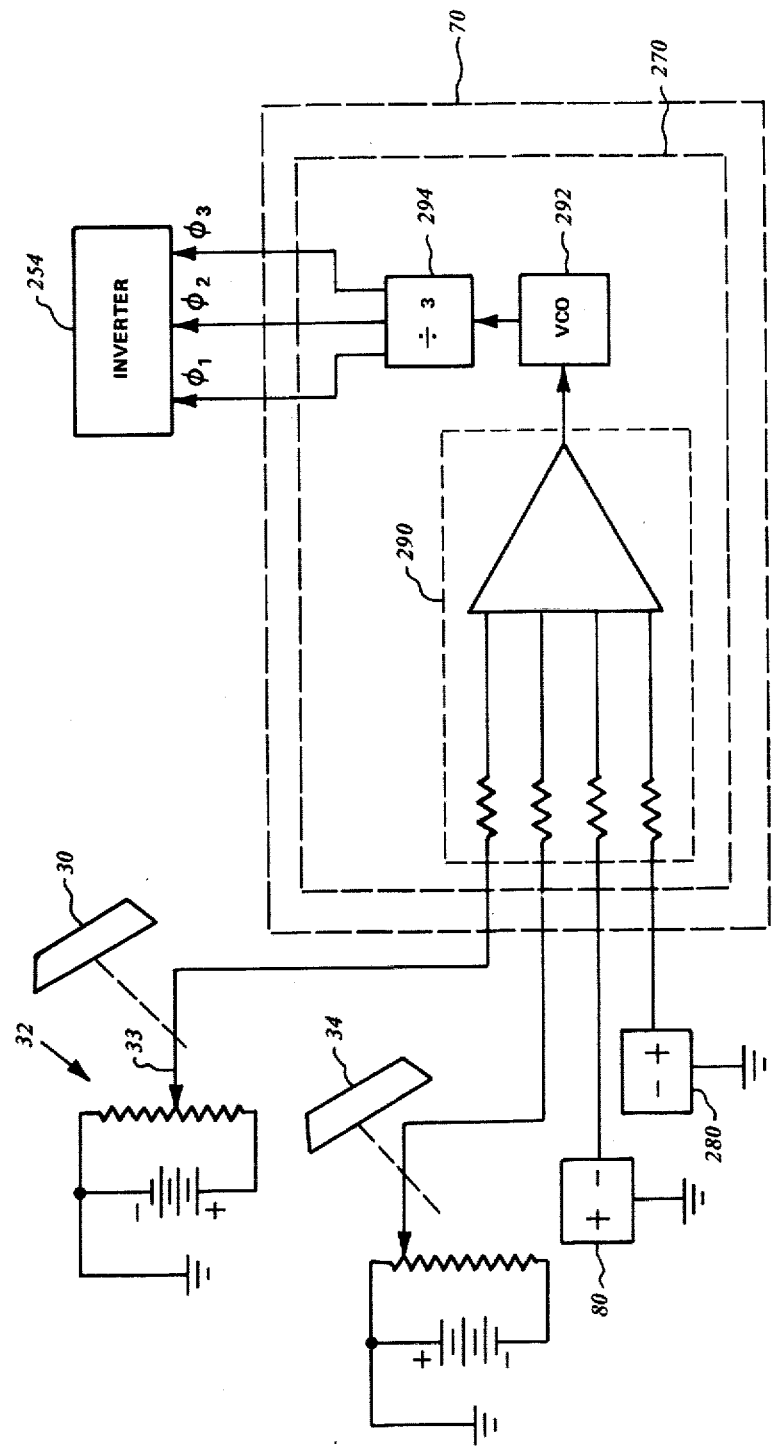
FIG. 9 is a simplified block diagram showing the controlling of one machine.

FIG. 9 illustrates a simple type of control wherein a linear combination of the deflection of accelerator pedal 30 and the speeds of rotation of flywheel 40 and core 210 is generated in analog summing circuit, or summer, 290, of circuit 270 of computing device 70, to cause power to flow out of the flywheel 40 and to the driveshaft 314. The arm 33 of the potentiometer 32 is attached to the accelerator pedal 30 and is grounded when the pedal 30 is not depressed and delivers no signal to summer 290 under that condition. When properly adjusted by choice of various resistors, as is conventional, summer 290 calculates the difference between the rotational speeds of the flywheel 40 and driveshaft 214 as measured by sensors 80 and 280 and, by way of voltage-controlled oscillator (VCO) 292 and frequency divider 294, generates excitation signals $\phi_1$, $\phi_2$ and $\phi_3$ to inverter 254 at the difference frequency of rotation. No torque is then transmitted from flywheel 40 to output shaft 314 and the vehicle coasts. When pedal 30 is depressed, a positive voltage at the arm 33 of the potentiometer 32 is generated and the excitation frequency applied to inverter 254 is decreased. (Because summer 290 inverts the positive voltage, decreases the input to VCO 292, and therefore its output frequency). As described supra, this causes the second machine to become an induction generator and an accelerating torque is applied to the driveshaft 314. At the same time, surplus electrical power becomes available and charges capacitor 60 via rectifier 256 (see FIG. 8).

In order to consume surplus electrical power that manifests itself as an increasing potential on capacitor 60, the third machine should be operated as a motor. This is accomplished by inverting the difference between the potential on capacitor 60, and a reference voltage—such as the potential of the amenities battery 62—and adding it to a circuit 370 similar to that of FIG. 9 but connected to inverter 354. This arrangement shown in FIG. 10, causes the third machine to become a motor that just uses up any surplus electrical power. For some uses, the third machine could be eliminated or electrically disconnected and replaced with a connection to an electric power system. In such a case the electric power system will supply or absorb power, as required. Such a configuration may be useful in elevators, etc. where operation is of an intermittent nature and a source of electric power such as battery or power main is available. Because one unit of electrical power controls several units of mechanical power in the present invention, the peak and the total electrical power demand upon the power system will therefore be reduced to provide significant savings.

Figure 10:
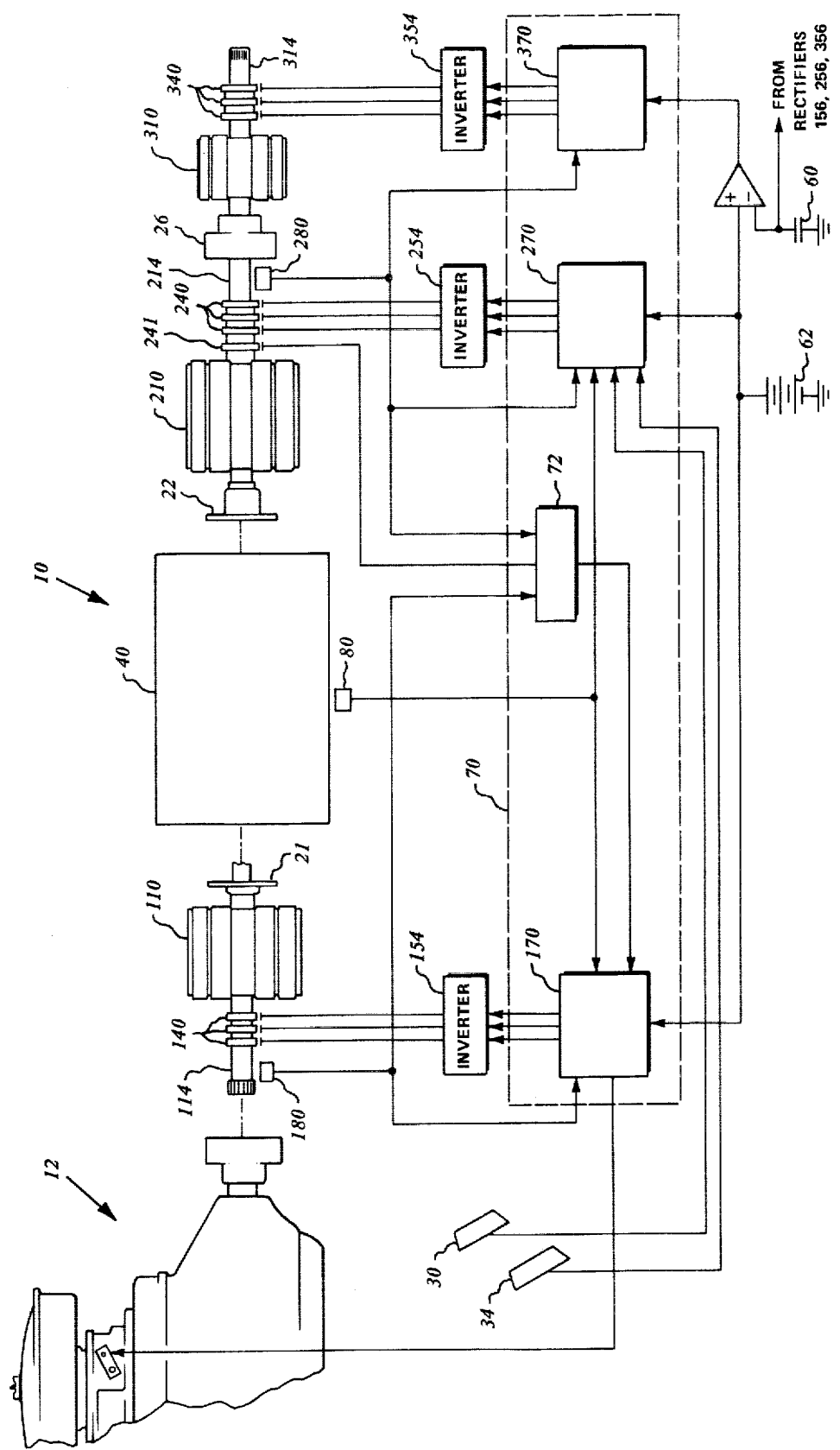
FIG. 10 is a block diagram of a typical control configuration.

The power being used by the vehicle being considered cannot by withdrawn from the flywheel 40 indefinitely. As the flywheel energy content is depleted by the extraction of power, it slows and this fact, sensed by comparing the output of sensor 80 against a reference speed, can be used to command additional power from the heat engine. Another circuit 170 similar to circuit 270 of FIG. 9, but connected to inverter 154 as shown in FIG. 10, would apply a suitable torque to load the heat engine 12. Since heat engines are most efficient when their speed of rotation is related to torque in a specific fashion, the heat engine speed, measured by sensor 180, is also controlled by the flywheel speed, the former speed being increased by throttle control when flywheel speed decreases. Minimum fuel consumption in the heat engine is assured by adjusting the torque, through the controlling of the frequency applied to inverter 154, until it has a proper relation to speed. In a simple case the torque might be adjusted to be a constant plus a term proportional to speed.

The above control configuration suffices for acceleration, and, with the addition to brake pedal 34 which is connected to a negative voltage source, as shown in FIG. 9, the FIG. 10 configuration is also suitable for braking. Slightly different arrangements would be used if the clutch 20 is engaged; primarily the excitation signals to inverter 154 would be disconnected. In addition, control unit 72 of computing device 70 senses the rotational speed of shaft 214 by means of sensor 280, and when this speed exceeds a predetermined threshold, control unit 72 signals circuit 170 to bring the rotational speed of the heat engine 12, as sensed at shaft 114, into synchronism with shaft 214. When synchronism is achieved, as sensed by comparison of the signals from sensors 180 and 280, clutch 20 is energized by supplying electrical power via slipring 241. Therefore controller 170 adjusts heat engine power to meet average power demand while controller 270 continues to meet fluctuating demands.

Figure 11:
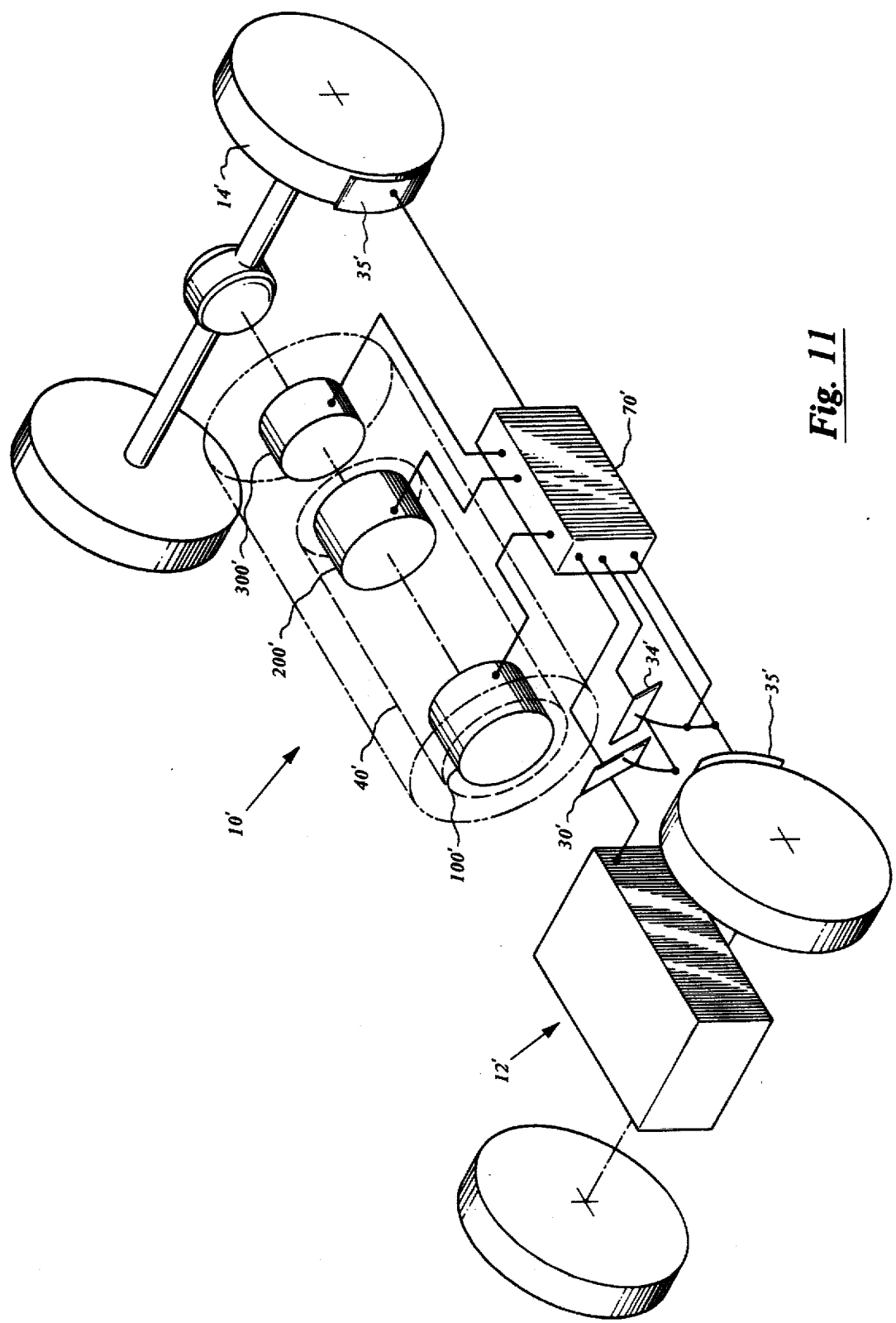
FIG. 11 is a simplified pictorial view of a second embodiment of the present invention employed in an electric car.
Figure 12:
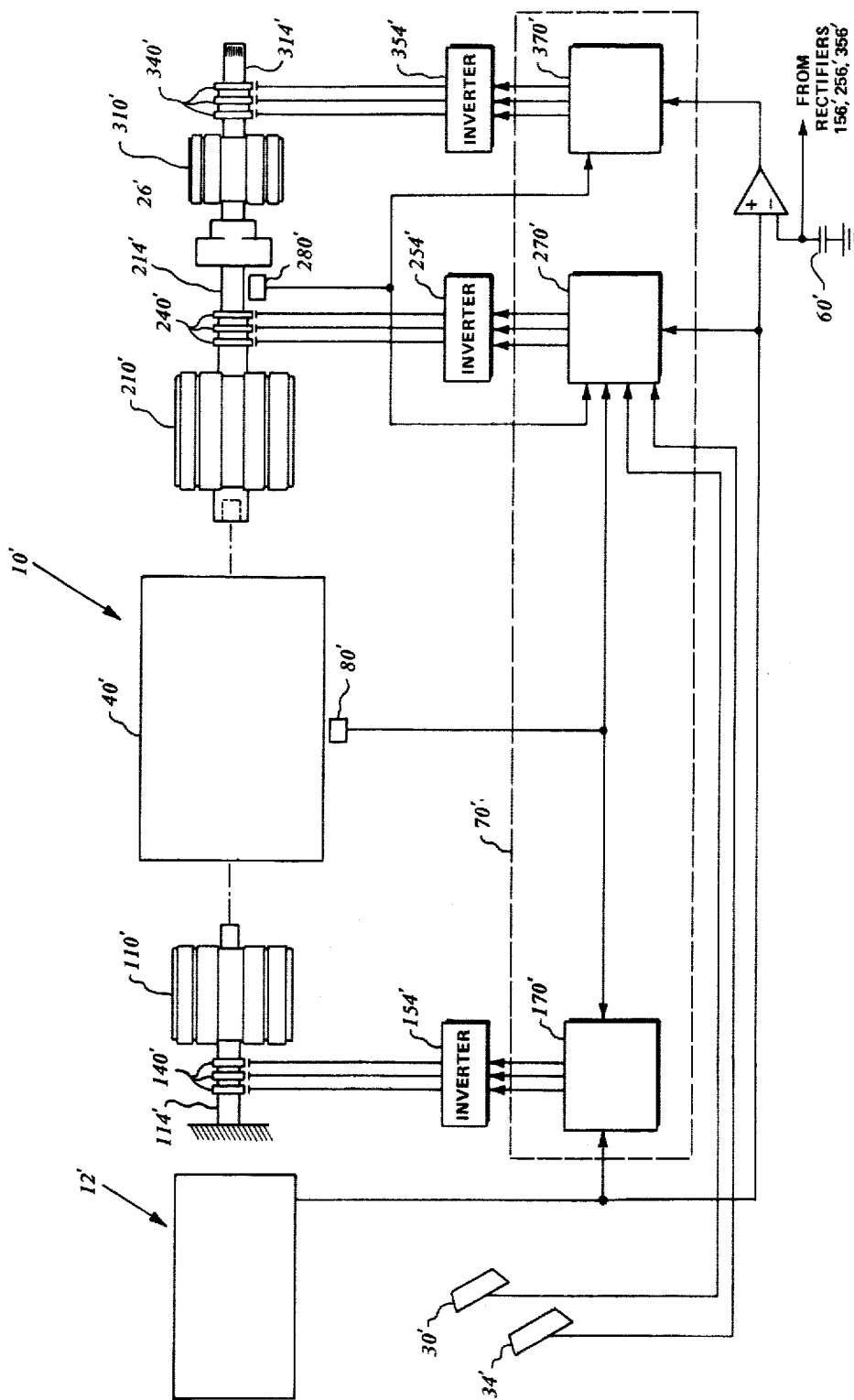
FIG. 12 is a block diagram of a typical control configuration for an electric car.

FIGS. 11 and 12 represent the electric car version of the devices of FIGS. 1 and 10, respectively, and corresponding structure has been given the same number with an added prime. The basic changes made in going to the electric car of FIGS. 11 and 12 are: (1) the elimination of clutch 20, slipring 241, control unit 72 and sensor 180 together with their associated structure; (2) the replacement of internal combustion engine 12 with battery pack 12'; and (3) the fixing of shaft 114'. The resulting FLET 10' would have two machines, 100' and 300', each with one fixed and one rotating element whereas in FLET 10 only machine 300 had a fixed element. The first machine, 100', would operate in a steady state and the second and third machines, 200' and 300', respectively, would operate in a nonsteady state depending upon the current driving conditions. Except for the absence of a direct drive and the presence of only an electromagnetic coupling between machines 100' and 200' the operation of FLET 10' would be essentially that of FLET 10 as set forth above. The average power demand would control the excitation frequency applied to inverter 154' but throttle control would be superfluous. In addition to these minor variations in configuration and control gains that could be selected in accordance with servo theory, it is possible to change certain gains, such as from flywheel speed to throttle setting, to integrals, to achieve smaller departures from ideal, but pre-calculated conditions.

In the foregoing discussion of the present invention, the gyroscopic effects of the spinning flywheel have been ignored. For a 5 to 8 megajoule flywheel one foot in diameter, operating at 20,000 RPM, and undergoing yawing at 30°/second, the resulting pitching torque is less than 2000 newton meters, which is equivalent to adding a passenger on the front or back of the car. This torque is clearly detectable but well within the capacity of the suspension and within the range of torques encountered with various effects in present day cars.

Although the present invention has been described and illustrated in terms of an automotive application, other applications and changes will occur to those skilled in the art. The electrical signals related to the differences in the speeds of rotation of the various members may be: (1) voltages with magnitudes approximately proportional to speed differences which might be applied to DC machines; (2) polyphase AC voltages with frequency approximately proportional to speed differences that might be applied to AC electric machines acting as continuously variable transmissions; or (3) parametric AC machines might be used by very accurate control of the frequencies.

The transmission of the present invention is suitable for use where the load fluctuates due either to acceleration and deceleration or due to working patterns. For example, the present invention could be used in elevators, cranes, oil-drilling rigs, cherry pickers, planting machinery, ore crushing machinery, etc. Control of the various functions in the transmission might be effected manually for slow, clumsy machinery such as an oil drilling rig, or almost completely automatic in a small industrial hoist where the computing device, inverters and rectifiers could be provided on a single integrated circuit. It is therefore intended that the scope of the present invention is to be limited only by the scope of the appended claims.

I claim:
1. A flywheel electric transmission including:
a first electric machine;
a second electric machine adjacent to said first machine and adapted to be connected to a load shaft for rotation therewith;
a kinetic energy storing device operatively associated with said first and second machines and carrying the armatures therefor; and
means for recycling excess electrical power generated between said second machine and said kinetic energy storing device.

2. The flywheel electric transmission of claim 1, wherein said first and second electric machines are configured as continuously variable transmissions and said kinetic energy storing device includes a flywheel.

3. The flywheel electric transmission of claim 2, further including clutch means for selectively mechanically connecting said first and second electric machines whereby an engine can be directly connected to a load when power demands are substantially constant.

4. The flywheel electric transmission of claim 3, wherein said means for recycling excess electrical power includes a third electric machine which is mechanically connected to said second machine and is scaled to provide or consume any imbalance in the power flow between said first and second machines.

5. The flywheel electric transmission of claim 2, wherein said means for recycling excess electrical power includes a third electric machine which is mechanically connected to said second machine and is scaled to provide or consume any imbalance in the power flow between said first and second machines.

6. A flywheel electric transmission including:
first electric machine means having an armature and a field structure and adapted for being mechanically driven by a prime mover;
second electric machine means having an armature and a field structure;
flywheel means carrying the armatures of said first and second machine means so as to rotate as a unit therewith; and
control means for causing one of said machine means to act as a generator and one of said machine means to act as a motor.

7. The flywheel electric transmission of claim 6, further including a third electric machine means mechanically connected to said second machine means and having an armature and a field structure and being adapted for driving a load.

8. The flywheel electric transmission of claim 6, further including a clutch means for selectively mechanically connecting said first and second machine means.

9. A flywheel electric transmissions including:
first electric machine means having an armature and a field structure and adapted for being mechanically driven by a prime mover;
second electric machine means having an armature and a field structure;
third electric machine means mechanically connected to said second machine means and having an armature and a field structure and being adapted for driving a load;
flywheel means carrying the armatures of said first and second machine means so as to rotate as a unit therewith;
clutch means for selectively mechanically connecting said first and second machine means; and
control means for causing at least one of said machine means to act as a generator and at least one said machine means to act as a motor and to activate said clutch means in response to operator inputs and the rotational speeds of said first and second machine means and said flywheel means.

10. The flywheel electric transmission of claim 9, wherein the field structures of each of said electric machine means include cores having windings thereon and said control means supply electrical signals to said windings according to the rotational speeds of said first and second machine means and said flywheel means in order to exert torques on said electric machine means and flywheel means in such a fashion as to effect the flow of power in a desirable direction.

11. The flywheel electric transmission of claim 10, wherein said electrical signals have a voltage approximately proportional to speed differences.

12. The flywheel electric transmission of claim 10, wherein said electrical signals, in the form of polyphase AC voltages, have frequencies approximately proportional to speed differences.

13. The flywheel electric transmission of claim 9, wherein said control means includes means for measuring imbalances of electrical power flow in said first and second machine means and for directing surplus power to said third machine means.

14. For use in a vehicle having an engine, accelerator and brakes, a flywheel electric transmission including:
first electric machine means having an armature and a field structure and adapted for being driven by the engine of a vehicle;
second electric machine means having an armature and a field structure;
flywheel means carrying the armatures of said first and second machine means so as to rotate as a unit therewith; and
control means for receiving inputs indicative of the actuation condition of the accelerator and brakes of the vehicle and the rotational speeds of the field structures of said first and second machine means and flywheel means and in response to said inputs to cause one of said machine means to act as a generator and one of said machine means to act as a motor whereby surplus energy is stored in said flywheel means and withdrawn as required.

15. The flywheel electric transmission of claim 14, further including a third electric machine means mechanically connected to said second machine means and having an armature and a field structure and being adapted for driving a vehicle.

16. The flywheel electric transmission of claim 14, further including a clutch means for selectively mechanically connecting said first and second machine means in response to said control means.

17. For use in a vehicle having an engine, accelerator and brakes, a flywheel electric transmission including:
first electric machine means having an armature and a field structure and adapted for being driven by the engine of a vehicle;
second electric machine means having an armature and a field structure;
third electric machine means mechanically connected to said second machine means and having an armature and a field structure and being adapted for driving a vehicle;
flywheel means carrying the armatures of said first and second machine means so as to rotate as a unit therewith;
clutch means for selectively mechanically connecting said first and second machine means;
control means for receiving input indicative of the actuation condition of the accelerator and brakes of the vehicle and the rotational speeds of the field structures of said first and second machine means and flywheel means and in response to said inputs to cause at least one of said machine means to act as a generator and one of said machine means to act as a motor and to activate said clutch means whereby surplus energy is stored in said flywheel means and withdrawn as required.

18. The flywheel electric transmission of claim 17, wherein the field structures of each of said electric machine means include cores having windings thereon and said control means supply electrical signals to said windings according to the rotational speeds of said first and second machine means and said flywheel means in order to exert torques on said electric machine means and flywheel means in such a fashion as to effect the flow of power in a desirable direction.

19. The flywheel electric transmission of claim 18, wherein said electrical signals have a voltage approximately proportional to speed differences.

20. The flywheel electric transmission of claim 18, wherein said electrical signals, in the form of polyphase AC voltage, have frequencies approximately proportional to speed differences.

21. The flywheel electric transmission of claim 17, wherein said control means includes means for measuring imbalances of electrical power flow in said first and second machine means and for directing surplus power to said third machine means.

22. A flywheel electric transmission for supplying power to a variable demand load from an essentially constant power source and including:
first electric machine means having an armature and a field structure and adapted for being constantly connected to an essentially constant power source;
second electric machine means having an armature and a field structure;
flywheel means for storing and supplying energy in response to load demands and carrying the armatures of said first and second machine means so as to rotate as a unit therewith;
control means for causing one of said machine means to act as a generator and one of said machine means to act as a motor in response to operator inputs and the rotational speeds of said first and second machine means and said flywheel means whereby energy is stored in or withdrawn from said flywheel means in response to varying load demands.

23. The flywheel electric transmission of claim 22, further including a third electric machine means mechanically connected to said second machine means and having an armature and a field structure and being adapted for driving a load.

24. The flywheel electric transmission of claim 22, further including a clutch means for selectively mechanically connecting said first and second machine means to thereby mechanically connect a power source and a load in response to said control means.

25. A flywheel electric transmission for supplying power to a variable demand load from an essentially constant power source and including:
first electric machine means having an armature and a field structure and adapted for being constantly connected to an essentially constant power source;
second electric machine means having an armature and a field structure;
third electric machine means mechanically connected to said second machine means and having an armature and a field structure and being adapted for driving a load;
flywheel means for storing and supplying energy in response to load demands and carrying the armatures of said first and second machine means so as to rotate as a unit therewith;
clutch means for selectively mechanically connecting said first and second machine means to thereby mechanically connect a power source and a load; and
control means for causing at least one of said machine means to act as a generator and at least one of said machine means to act as a motor and to activate said clutch means in response to operator inputs and the rotational speeds of said first and second machine means and said flywheel means whereby energy is stored in or withdrawn from said flywheel means in response to varying load demands.

26. The flywheel electric transmission of claim 25, wherein the field structures of each of said electric machine means include cores having windings thereon and said control means supply electrical signals to said windings according to the rotational speeds of said first and second machine means and said flywheel means in order to exert torques on said electric machine means and flywheel means in such a fashion as to effect the flow of power in a desirable direction.

27. The flywheel electric transmission of claim 26, wherein said electrical signals have a voltage approximately proportional to speed differences.

28. The flywheel electric transmission of claim 26, wherein said electrical signals, in the form of polyphase AC voltages, have frequencies approximately proportional to speed differences.

29. The flywheel electric transmission of claim 25, wherein said control means includes means for measuring imbalances of electrical power flow in said first and second machine means and for directing surplus power to or from said third machine means.

30. A drive for a vehicle comprising:
a power source;
an electric device including rotatably mounted first and second armatures and first and second field structures;
an output shaft connected to transmit rotary power to the vehicle drive output;
means coupling said power source directly to said first field structure;
means coupling said second field structure to said output shaft;
flywheel means connected to said armatures for concurrent rotation therewith; and
means for exciting each of said field structures.

31. A drive as defined in claim 30, wherein said flywheel means and said armatures are constructed and rotatably mounted as a unit.

32. A drive as defined in claim 31, wherein said power source is a heat engine.

33. A drive as defined in claim 31, wherein said power source is an electrical source connected to said first field structure and arranged to create a rotating field.

34. A drive as defined in claim 31, further including a selectively operable clutch connecting said first and second field structures and providing a direct drive connection to the vehicle drive output from said power source.

35. A drive as defined in claim 30, wherein said power source is a heat engine.

36. A drive as defined in claim 30, wherein said power source is an electrical source connected to said first field structure and arranged to create a rotating field.

37. A drive as defined in claim 30, further including a selectively operable clutch connecting said first and second field structures and providing a direct drive connection to the vehicle drive output from said power source.

38. A drive for a vehicle comprising:
a power source;
an electric device including rotatably mounted first and second armatures and first and second field structures;
an output shaft connected to transmit rotary power to the vehicle drive output;
a third field structure mounted for rotation with said output shaft and having a third armature in surrounding relation thereto;
means coupling said power source directly to said first field structure;
means coupling said second field structure to said output shaft;
flywheel means connected to said armatures for concurrent rotation therewith; and
means for exciting each of said field structures.

39. A drive as defined in claim 38, wherein said flywheel means and said first and second armatures are constructed and rotatably mounted as a unit.

40. A drive as defined in claim 39, wherein said power source is a heat engine.

41. A drive as defined in claim 39, wherein said power source is an electrical source connected to said first field structure and arranged to create a rotating field.

42. A drive as defined in claim 39, further including a selectively operable clutch connecting said first and second field structures and providing a direct drive connection to the vehicle drive output from said power source.

43. A drive as defined in claim 38, wherein said power source is a heat engine.

44. A drive as defined in claim 38, wherein said power source is an electrical source connected to said first field structure and arranged to create a rotating field.

45. A drive as defined in claim 38, further including a selectively operable clutch connecting said first and second field structures and providing a direct drive connection to the vehicle drive output from said power source.

46. A drive for a vehicle comprising:
an engine having a rotary output;
an electric device including rotatably mounted first and second armatures and first and second field structures rotatable with respect to said armatures;
an output shaft connected to transmit motive power to drive the vehicle;
first coupling means for coupling said engine to said first field structure;
second coupling means for coupling said second field structure to said output shaft;
a cylindrical flywheel supporting said armatures for concurrent rotation therewith; and
means for exciting separately each of said field structures.

47. A drive as defined in claim 46, wherein first and second coupling means include gearing causing said flywheel to operate at substantially greater speeds than said engine and/or said output shaft.

48. A drive for a vehicle comprising:
an engine having a rotary output;
an electric device including rotatably mounted first and second armatures and first and second field structures rotatable with respect to said armatures;
an output shaft connected to transmit motive power to drive the vehicle;
a third field structure mounted for rotation with said output shaft and having a third armature in surrounding relation thereto;
first coupling means for coupling said engine to said first field structure;
second coupling means for coupling said second field structure to said output shaft;
a cylindrical flywheel supporting said first and second armatures for concurrent rotation therewith; and
means for exciting separately each of said field structures.

49. A drive as defined in claim 48, wherein first and second coupling means include gearing causing said flywheel to operate at substantially greater speeds than said engine and/or said output shaft.

* * * * *